United States Patent
Chen et al.

[11] Patent Number: 5,814,898
[45] Date of Patent: Sep. 29, 1998

[54] UNINTERRUPTABLE POWER SUPPLY DEVICE FOR A MOTOR

[75] Inventors: Jiann-Fuh Chen; Man-Ming Lai; Kuo-Jiann Huang; Tian-Wen Liu, all of Taipei, Taiwan

[73] Assignee: Delta Electronics, Inc., Taipei, Taiwan

[21] Appl. No.: 808,059

[22] Filed: Feb. 28, 1997

[51] Int. Cl.[6] ............................................. H02J 7/00
[52] U.S. Cl. ............................................................. 307/66
[58] Field of Search ........................... 307/64–66, 43, 307/80, 82, 85–87; 318/105–107, 434; 226/11, 45; 242/390.8, 390.9, 413.5, 413.6

[56] References Cited

U.S. PATENT DOCUMENTS

| | | |
|---|---|---|
| 4,506,766 | 3/1985 | Watanabe .................................... 307/64 |
| 5,612,580 | 3/1997 | Janonis et al. ............................. 307/64 |

Primary Examiner—Richard T. Elms

[57] ABSTRACT

An uninterruptable power supply device for a motor is disclosed. The uninterruptable power supply device includes: a power storing device, connected to a utility AC power source, for storing an electrical charge; a DC/AC convertor, connected to the power storing device, for converting DC power outputted from the power storing device into AC power to be used by the motor; a first switch, connected to the utility AC power source, the DC/AC convertor, and the motor, for performing a switching operation in response to a status condition of the utility AC power source; a detecting/control circuit, connected to the motor, for detecting a loading status of the motor and outputting a control signal indicative of the loading status; and a second switch, connected to the detecting/control circuit, the power storing device, and the DC/AC convertor, for performing a switching operation in response to the control signal, wherein the second switch disconnects the power storing device from the DC/AC convertor if the control signal indicates that the motor is not loading the power storing device.

7 Claims, 3 Drawing Sheets

5,814,898

UNINTERRUPTABLE POWER SUPPLY DEVICE FOR A MOTOR

FIELD OF THE INVENTION

The present invention relates to an uninterruptable power supply device, and more particularly to an uninterruptable power supply device for a motor.

BACKGROUND OF THE INVENTION

An electrically controlled door device is broadly used in public organizations, schools and companies, and many motorized spooling iron doors are provided on private houses. Such electrically controlled door device has some problems on stability and reliability which are influenced mostly by the power supply part.

A conventional uninterruptable power supply system employed in a motorized spooling iron door is shown in FIG. 1, which comprises an AC/DC convertor 11, a DC/AC convertor 12, a battery set 13 and a switch 14. When the utility power 10 is operating normally, the switch 14 will deliver the AC power of said utility power 10 to an AC motor 15 of the motorized spooling iron door. When utility power 10 is interrupted, the switch 14 made of solid relay will detect out the interrupted status of the utility power 10, thus the battery set 13 will provide power through DC/AC convertor 12 to the AC motor 15 of the motorized spooling iron door. However, the above operation will cause that during an unloading status of the AC motor 15 (i.e. no winding action of the spooling iron door), the DC/AC convertor 12 will still consume the power of the battery set 13, therefore, after several hours of power consumption, the battery set 13 is unable to drive the AC motor 15 for winding the spooling iron door.

SUMMARY OF THE INVENTION

The present invention relates to an uninterruptable power supply device for a motor, which comprises: a power storing device connected to a utility AC power for performing an electrical charging; a DC/AC convertor connected to said power storing device for converting a DC power outputted from said power storing device into an AC power to be used by said motor; a first switch connected to said utility AC power, said DC/AC convertor, and said motor for performing a switching operation in response to a status of said utility AC power; a detecting/control circuit connected to said motor for detecting a loading status of said motor to output a control signal; and a second switch connected to said detecting/control circuit, said power storing device, and said DC/AC convertor for performing a switching operation in response to said control signal.

According to the above idea, wherein the uninterruptable power supply device for a motor further comprises an AC/DC convertor connected between said power storing device and said utility AC power for converting said utility AC power into a DC power to charge said power storing device.

According to the above idea, wherein said power storing device in the uninterruptable power supply device for a motor is a battery set.

According to the above idea, wherein said first switch in the uninterruptable power supply device for a motor will switch a connection between said utility AC power and said motor being on when said utility AC power is in normal operating status; and will switch a connection between said DC/AC convertor and said motor being on when said utility AC power is in an interrupted status.

According to the above idea, wherein said detecting/control circuit in the uninterruptable power supply device for a motor will output one of two control signals representing a loading status and an unloading status after detecting the status of said motor.

According to the above idea, wherein said second switch in the uninterruptable power supply device for a motor will switch a connection between said power storing device and said DC/AC convertor being off when a control signal representing unloading status is received; and will switch said connection between said power storing device and said DC/AC convertor being on when a control signal representing loading status is received.

According to the above idea, wherein said first switch in the uninterruptable power supply device for a motor is made of a solid state relay.

BRIEF DESCRIPTIONS OF THE DRAWINGS

The present invention can be better understood by the detailed descriptions of the following drawings, in which.

DETAILED DESCRIPTION OF THE PREFERRED EMBODIMENT

Figure 1:
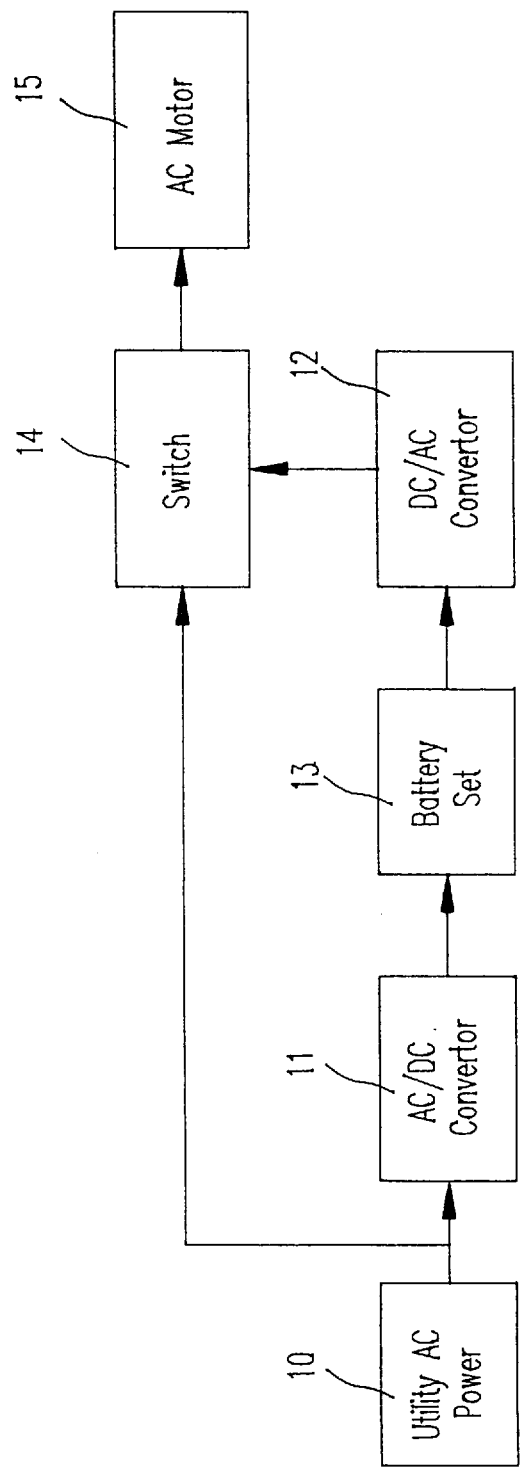
FIG. 1 is a conventional uninterruptable power supply system employed in a motorized spooling iron door.
Figure 2:
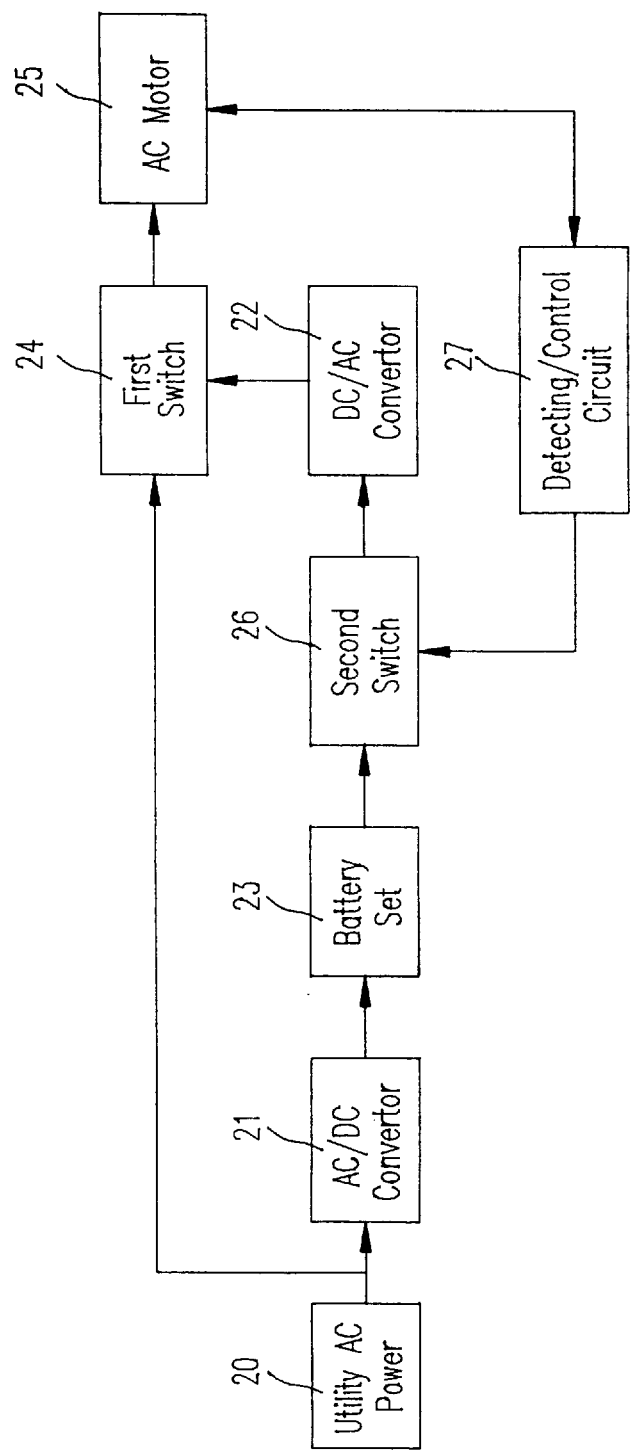
FIG. 2 is a functional block diagram of a preferred embodiment of the present invention.

Please refer to FIG. 2, which is a functional block diagram of a preferred embodiment of the present invention. When the utility power 20 is operating normally, a first switch 24 will deliver the AC power of said utility power 20 to an AC motor 25 of a motorized spooling iron door, while an AC/DC convertor 21 will convert said AC power of said utility power 20 into a DC power for charging a battery set 23. When the utility power 20 is interrupted, the first switch 24 made of a solid state relay will detect out the interrupted status of said utility power 20, thus the battery set 23 will provide power to AC motor 25 of the motorized spooling iron door by means of DC/AC convertor 22, and a second switch 26 is provided between battery set 23 and DC/AC convertor 22 for receiving a control signal outputted from a detecting/control circuit 27. The detecting/control circuit 27 is used to detect the loading status of said AC motor 25. When said AC motor 25 is in an unloading status (e.g. no winding action of said spooling iron door), the detecting/control circuit 27 will detect out said status and generate a control signal representing unloading status to the second switch 26 for interrupting the connection between DC/AC convertor 22 and battery set 23 in order to save the power of the battery set 23. When said AC motor 25 is in a loading status ( e.g. in a winding action of said spooling iron door), the detecting/control circuit 27 will detect out said status and generate a control signal representing loading status to the second switch 26 for connecting DC/AC convertor 22 and battery set 23 in order to provide power to the AC motor 25. Consequently, the drawback of the conventional art is improved to achieve the major object of the present invention.

Figure 3:
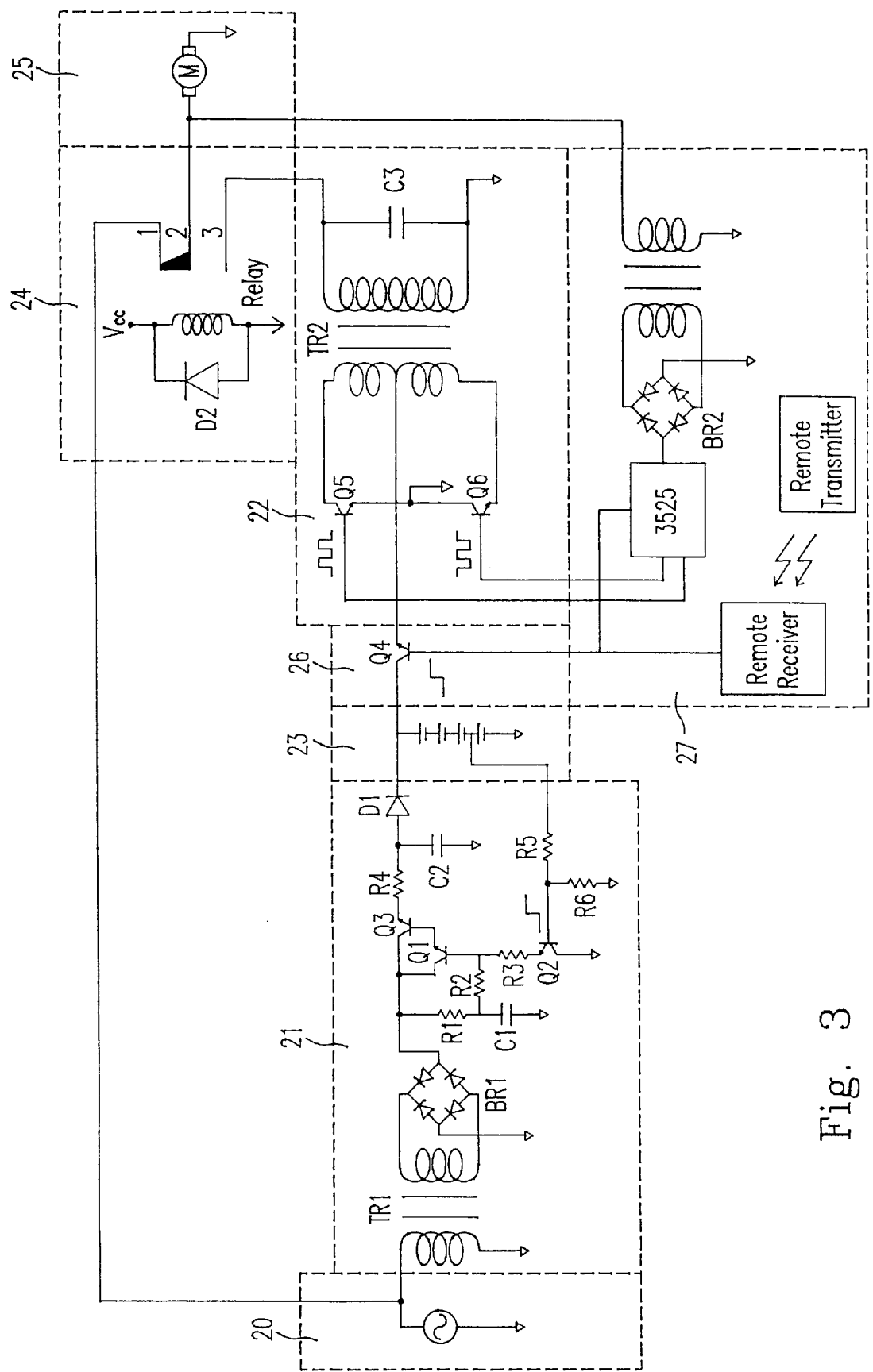
FIG. 3 is a circuit diagram of the preferred embodiment of the present invention.

FIG. 3 is a circuit diagram of the preferred embodiment of the present invention, wherein various elements are described as below:

1. The utility power 20 is 110 V, 60 Hz.
2. AC/DC convertor 21 converts said utility power 20 into a 48 V DC power for charging said battery set 23.

3. Battery set 23 has 4 sets of battery 12 V, 7 Ah connected in series for storing energy.
4. The first switch 24 made of a solid state relay is used to detect the status of the utility power. When utility power is operating normally, points 1 and 2 will be connected; when utility power is interrupted, points 2 and 3 will be connected.
5. The second switch 26 is used to receive a control signal outputted from the detecting/control circuit 27 for determining the connection status between DC/AC convertor 22 and battery set 23.
6. DC/AC convertor 22 has a push-pull configuration to allow transistors Q5, Q6 conducting alternately, thereby a square wave of 154 V$_{P-P}$, 60 Hz is obtained.
7. The above-described circuit can receive signals from a remote controller and a push button of the spooling iron door motor for judging the loading status of the motor 25 (i.e. the operating status), and then output a control signal to control the second switch 26.
8. The AC motor 25 is of single phase, 110 V, ¼ horsepower.

Due to that only a slight power consumption of the detecting/control circuit, the present invention can reduce the power consumption during unloading status of the AC motor, therefore the uninterruptable power supply device of the present invention can maintain a longer time during utility power interruption. The above idea can also be employed to other uninterruptable power supply devices such as a pumping motor.

The above embodiments can be modified by any skillful person in the art without departing the spirit and scope of the accompanying claims.

What is claimed is:

1. An uninterruptable power supply device for a motor, comprising:
    a power storing device, electrically connected to a utility AC power source, wherein said utility AC power source charges said power storing device;
    a DC/AC convertor, electrically connected to said power storing device, for converting a DC power outputted from said power storing device into an AC power to be used by said motor;
    a first switch, electrically connected to said utility AC power source, said DC/AC convertor, and said motor, for performing a first switching operation in response to a status of said utility AC power source;
    a detecting/control circuit, electrically connected to said motor, for receiving a status signal from a controller of said motor, determining a status condition of said motor, and outputting a control signal indicative of said status condition; and
    a second switch, electrically connected to said detecting/control circuit, said power storing device, and said DC/AC convertor, for performing a second switching operation in response to said control signal, wherein said second switch disconnects said power storing device from said DC/AC convertor if the control signal indicates that said motor is not loading said power storing device.

2. The uninterruptable power supply device for a motor according to claim 1, further comprising an AC/DC convertor electrically connected between said power storing device and said utility AC power source for converting said utility AC power into a DC power to charge said power storing device.

3. The uninterruptable power supply device for a motor according to claim 1, wherein said power storing device is a battery set.

4. The uninterruptable power supply device for a motor according to claim 1, wherein said first switch will switch on a connection between said utility AC power source and said motor when said utility AC power source is in a normal operating status; and will switch on a connection between said DC/AC convertor and said motor when said utility AC power source is in an interrupted status.

5. The uninterruptable power supply device for a motor according to claim 1, wherein said control signal outputted by said detecting/control circuit represents either a loading status or an unloading status.

6. The uninterruptable power supply device for a motor according to claim 5, wherein said second switch connects said power storing device and said DC/AC convertor when said control signal represents a loading status.

7. The uninterruptable power supply device for a motor according to claim 1, wherein said first switch is made of a solid state relay.

* * * * *